United States Patent
Buzsaki et al.

(10) Patent No.: US 7,752,207 B2
(45) Date of Patent: Jul. 6, 2010

(54) CRAWLABLE APPLICATIONS

(75) Inventors: George Buzsaki, Fremont, CA (US);
Kevin Hudson, San Francisco, CA (US);
Anping Wang, Redwood Shores, CA
(US); David Lam, Sunnyvale, CA (US)

(73) Assignee: Oracle International Corporation,
Redwood Shores, CA (US)

( * ) Notice: Subject to any disclaimer, the term of this patent is extended or adjusted under 35 U.S.C. 154(b) by 422 days.

(21) Appl. No.: 11/742,961

(22) Filed: May 1, 2007

(65) Prior Publication Data

US 2008/0275844 A1   Nov. 6, 2008

(51) Int. Cl.
*G06F 17/30* (2006.01)
*G06F 15/173* (2006.01)
(52) U.S. Cl. .................... 707/737; 709/226
(58) Field of Classification Search ............. None
See application file for complete search history.

(56) References Cited

U.S. PATENT DOCUMENTS

| | | | | |
|---|---|---|---|---|
| 7,249,100 | B2* | 7/2007 | Murto et al. | 705/50 |
| 7,426,526 | B2* | 9/2008 | Chen et al. | 707/104.1 |
| 2002/0174117 | A1* | 11/2002 | Nykanen | 707/4 |
| 2004/0098358 | A1* | 5/2004 | Roediger | 706/46 |
| 2004/0213409 | A1* | 10/2004 | Murto et al. | 380/258 |
| 2005/0182792 | A1* | 8/2005 | Israel et al. | 707/104.1 |
| 2006/0048155 | A1* | 3/2006 | Wu et al. | 718/101 |
| 2006/0165040 | A1* | 7/2006 | Rathod et al. | 370/335 |
| 2006/0184617 | A1* | 8/2006 | Nicholas et al. | 709/203 |
| 2007/0055691 | A1* | 3/2007 | Statchuk | 707/102 |
| 2007/0106933 | A1* | 5/2007 | Nene et al. | 715/513 |
| 2007/0162467 | A1* | 7/2007 | Wolber et al. | 707/100 |
| 2007/0208697 | A1* | 9/2007 | Subramaniam et al. | 707/3 |
| 2007/0226242 | A1* | 9/2007 | Wang et al. | 707/102 |
| 2007/0239674 | A1* | 10/2007 | Gorzela | 707/3 |
| 2007/0299813 | A1* | 12/2007 | Subramaniam et al. | 707/2 |
| 2008/0005194 | A1* | 1/2008 | Smolen et al. | 707/202 |
| 2008/0021881 | A1* | 1/2008 | Subramaniam et al. | 707/3 |
| 2008/0091448 | A1* | 4/2008 | Niheu et al. | 705/1 |
| 2008/0126476 | A1* | 5/2008 | Nicholas et al. | 709/203 |
| 2008/0133960 | A1* | 6/2008 | Wong et al. | 714/2 |
| 2008/0183674 | A1* | 7/2008 | Bush et al. | 707/3 |

(Continued)

OTHER PUBLICATIONS

U.S. Appl. No. 11/277,585, filed Mar. 27, 2006, Wang et al.

(Continued)

*Primary Examiner*—Neveen Abel Jalil
*Assistant Examiner*—Tarek Chbouki
(74) *Attorney, Agent, or Firm*—Townsend and Townsend and Crew LLP

(57) ABSTRACT

Systems and methods in accordance with various embodiments of the present invention provide for a computer based method for crawling application data from an application data store. The applications data store has business objects of an application stored thereon. The method may include identifying a first request for application data received from a search engine as a seed universal resource locator (URL). A crawlable definition for the identified business object is accessed, the crawlable definition including a query selecting one or more attributes of the business object. Moreover, the method can include sending the query to the application data store and receiving query results in response thereto. Additionally, the method can include forming a crawlable document which includes the retrieved results of the business object.

21 Claims, 12 Drawing Sheets

U.S. PATENT DOCUMENTS

2009/0150735 A1* 6/2009 Israel et al. .................. 714/746

OTHER PUBLICATIONS

Alonso et al., "Oracle Secure Enterprise Search 10g", An Oracle Technical White Paper, Mar. 2006, 20 pages.

Ford et al., "Secure Searching with Oracle Secure Enterprise Search," An Oracle White Paper, Mar. 2006, 14 pages.

Google, "Enterprise Solutions: Google Search Appliance" [webpage], downloaded from the Internet: <<http://www.google.com/enterprise/gsa/>>, 2 pages.

Risvik et al., "Search Engines and Web Dynamics," *Computer Networks*, 39(3):289-302, 2002.

* cited by examiner

Business Object: RequisitionsSVO

Tablename: Requisition

| Requisition_Header_ID | Preparer_ID | Last_Update_Date | Item_Description | Authorization_Status | Org_ID | Segment 1 |
|---|---|---|---|---|---|---|
| 17212 | 3 | 2006-10-15 | keyboard | Approved | 30 | 1458 |
| 17213 | 104 | 2005-12-01 | optical mouse | Denied | 551 | 2345 |
| 17214 | 7 | 2006-11-28 | speaker | Pending | 112 | 4562 |
| 17215 | 25 | 2006-04-12 | flat screen monitor | Approved | 204 | 2066 |
| 17216 | 28 | 2006-02-10 | mouse pad | Approved | 273 | 2373 |

Tablename: Employee

| Employee_Number | Last_Name | First_Name | Title | Email | Person_ID | Eff_Start_Date | Eff_End_Date | SSN |
|---|---|---|---|---|---|---|---|---|
| 22 | Smith | David | Mr. | dsmith@oracle.com | 25 | 1986-02-01 | | *** ** **** |
| 23 | Wang | John | Mr. | jwang@oracle.com | 20 | 1986-06-10 | | *** ** **** |
| 24 | Stock | Pat | Ms. | pstock@oracle.com | 25 | 1987-01-01 | 4712-12-31 | *** ** **** |
| 25 | Allison | Deb | Ms. | dallison@oracle.com | 23 | 2003-11-28 | | *** ** **** |

*FIG. 1*

```xml
<?xml version="1.0" encoding="ISO-8859-1" ?>
<ViewObject Name="RequisitionsSVO" BindingStyle="OracleName" CustomQuery="true">
<SQLQuery>
        SELECT Req.REQUISITION_HEADER_ID,
               Req.PREPARER_ID,
               Req.LAST_UPDATE_DATE,
               Req.DESCRIPTION,
               Req.ORG_ID,
               Req.SEGMENT1,
               Req.AUTHORIZATION_STATUS,
               Employee.PERSON_ID,
               Employee.EFFECTIVE_START_DATE,
               Employee.EFFECTIVE_END_DATE,
               Employee.LAST_NAME,
               Employee.EMAIL_ADDRESS,
               Employee.FIRST_NAME,
               Employee.TITLE,
               Employee.EMPLOYEE_NUMBER
          FROM HR.PER_ALL_PEOPLE_F Employee, PO.PO_REQUISITION_HEADERS_ALL Req
         WHERE (Employee.person_ID = Req.preparer_ID)

</SQLQuery>
<ViewAttribute Name="RequisitionHeaderId" IsPersistent="false" IsNotNull="true"
Type="oracle.jbo.domain.Number" ColumnType="NUMBER"
AliasName="REQUISITION_HEADER_ID" Expression="REQUISITION_HEADER_ID"
SQLType="NUMERIC">
<Properties>
  <Property Name="CRAWL_IS_DISPLAYED" Value="true" />
  <Property Name="CRAWL_IS_INDEXED" Value="true" />
  <Property Name="CRAWL_IS_SECURE" Value="false" />
  <Property Name="CRAWL_IS_STORED" Value="true" />
  <Property Name="CRAWL_IS_TITLE" Value="true" />
  <Property Name="CRAWL_UI_FUNC_PARAM_NAME" Value="reqHeaderId" />
  <Property Name="CRAWL_WEIGHT" Value="1" />
  <Property Name="SVC_DATATYPE" Value="oracle.jbo.domain.Number" />
  <Property Name="SVC_DOCUMENTATION" Value="Req Id" />
  <Property Name="SVC_SIZE" Value="0" />
  <Property Name="SVC_TRANSLATABLE" Value="false" />
</Properties></ViewAttribute>
<ViewAttribute Name="PreparerId" IsPersistent="false" IsNotNull="true" Precision="9"
Scale="0" Type="oracle.jbo.domain.Number" ColumnType="NUMBER"
AliasName="PREPARER_ID" Expression="PREPARER_ID" SQLType="NUMERIC">
<Properties>
  <Property Name="CRAWL_IS_DISPLAYED" Value="false" />
  <Property Name="CRAWL_IS_INDEXED" Value="false" />
  <Property Name="CRAWL_IS_SECURE" Value="false" />
  <Property Name="CRAWL_IS_STORED" Value="true" />
  <Property Name="CRAWL_IS_TITLE" Value="false" />
  <Property Name="CRAWL_WEIGHT" Value="1" />
  <Property Name="SVC_DATATYPE" Value="oracle.jbo.domain.Number" />
  <Property Name="SVC_DOCUMENTATION" Value="Emp Id" />
  <Property Name="SVC_SIZE" Value="9" />
  <Property Name="SVC_TRANSLATABLE" Value="false" />
</Properties></ViewAttribute>
```

*FIG. 4A*

```
<ViewAttribute Name="PersonId" IsPersistent="false" IsNotNull="true" Precision="10"
Scale="0" Type="oracle.jbo.domain.Number" ColumnType="NUMBER"
AliasName="PERSON_ID" Expression="PERSON_ID" SQLType="NUMERIC">
  <Properties>
    <Property Name="CRAWL_IS_DISPLAYED" Value="false" />
    <Property Name="CRAWL_IS_INDEXED" Value="false" />
    <Property Name="CRAWL_IS_SECURE" Value="true" />
    <Property Name="CRAWL_IS_STORED" Value="true" />
    <Property Name="CRAWL_IS_TITLE" Value="false" />
    <Property Name="CRAWL_WEIGHT" Value="1" />
    <Property Name="SVC_DATATYPE" Value="oracle.jbo.domain.Number" />
    <Property Name="SVC_DOCUMENTATION" Value="Person" />
    <Property Name="SVC_SIZE" Value="10" />
    <Property Name="SVC_TRANSLATABLE" Value="false" />
  </Properties>   </ViewAttribute>
```

*FIG. 4B*

```xml
<dataChannel>
  <title>RSS for apps EBusiness Suite</title>
  <link>http://qapache.us.oracle.com:8566/webservices/AppSearch/
oracle.apps.fnd.search.demo.RequisitionsSVO/DataFeed</link>
  <lastBuildDate>2007-01-08T11:20:12.139Z</lastBuildDate>
  <searchableObject>
    <link>http://qapache.us.oracle.com:8566/OA_HTML/
RF.jsp?function_id=1042039&resp_id=-1&resp_appl_id=-
1&security_group_id=0&lang_code=US&params=Rp-
8WSWLscqANKamyX79VnWF7AbQ.W3QwF5TpI4TAfyIUyCzUupwVIt4n3OWQ.XrD7fYGs2Uf
0HkEYY2Jfychd16ikBbdw.X8BBe.Em.o24qfU3bb3c-7yCnye1yPJ3S&oas=BCvfa9Grh3cr5o--
-KVdBA..</link>
    <primaryKey>17215</primaryKey>
    <title>17215 Flat Screen Monitors</title>
    <attribute name="REQUISITION_HEADER_ID">17215</attribute>
    <attribute name="PREPARER_ID">25</attribute>
    <attribute name="LAST_UPDATE_DATE">2006-04-12T00:00:00.000Z</attribute>
    <attribute name="DESCRIPTION">Flat Screen Monitors</attribute>
    <attribute name="ORG_ID">204</attribute>
    <attribute name="SEGMENT1">2066</attribute>
    <attribute name="AUTHORIZATION_STATUS">APPROVED</attribute>
    <attribute name="PERSON_ID">25</attribute>
    <attribute name="EFFECTIVE_START_DATE">1987-01-01T00:00:00.000Z</attribute>
    <attribute name="EFFECTIVE_END_DATE">4712-12-31T00:00:00.000Z</attribute>
    <attribute name="LAST_NAME">Stock</attribute>
    <attribute name="EMAIL_ADDRESS">pstock@vision.com</attribute>
    <attribute name="FIRST_NAME">Pat</attribute>
    <attribute name="TITLE">MS.</attribute>
    <attribute name="EMPLOYEE_NUMBER">24</attribute>
    <securityAttribute>
      <securityAttr name="PERSON_ID">25</securityAttr>
      <securityAttr name="EBS_ACL_KEY">xyz100001x</securityAttr>
    </securityAttribute>
    <operation>
      <status>INSERT</status>
    </operation>
    <indexableContent>
      <indexableContent type="text/plain">17215 Flat Screen Monitors 204 2066 APPROVED
1987-01-01 4712-12-31 Stock pstock@vision.com Pat MS. 24</indexableContent>
      <contentLink type="text/html">http://qapache.us.oracle.com:8566/webservices/
AppSearch/oracle.apps.fnd.search.demo.InterfaceClassesSVO/
Attachment?schemaName=test&tableName=FND_IREP_CLASSES+B&columnName=DESC
RIPTION&keyCount=1&keyName0=CLASS_ID&keyValue0=931</contentLink>
    </indexableContent>
  </searchableObject>
</dataChannel>
</AppSearchFeed>
```

*FIG. 5*

```xml
<?xml version="1.0" encoding="UTF-8" ?>
 <AppSearchFeed xmlns:xsi="http://www.w3.org/2001/XMLSchema-instance"
xsi:schemaLocation="http://xmlns.oracle.com/appSearch.xsd">
  <controlChannel>
    <title>Control feed for apps EBusiness Suite</title>
    <link>http://RequisitionsSVO/ControlFeed</link>
    <lastBuildDate>2007-01-08T11:19:24.749Z</lastBuildDate>
    <description xmlns="http://xmlns.oracle.com/orarss">This channel contains data sourced for oracle application requisition searchable object</description>
   <feed id="1231">
    <description xmlns="http://xmlns.oracle.com/orarss">requisition from AAGyXcAACAAAWnpAAA to AAGyXcAACAAAWn4CcP</description>
    <link>http://qapache.us.oracle.com:8566/webservices/AppSearch/oracle.apps.fnd.search.demo.RequisitionsSVO/DataFeed?tableName=Req&workUnitStart=AAGyXcAACAAAWnpAAA&workUnitEnd=AAGyXcAACAAAWn4CcP</link>
    </feed>
   <feed id="1232">
    <description xmlns="http://xmlns.oracle.com/orarss">requisition from AAGyXcAC1AAA6jpAAA to AAGyXcAC1AAA6j4CcP</description>
    <link>http://qapache.us.oracle.com:8566/webservices/AppSearch/oracle.apps.fnd.search.demo.RequisitionsSVO/DataFeed?tableName=Req&workUnitStart=AAGyXcAC1AAA6jpAAA&workUnitEnd=AAGyXcAC1AAA6j4CcP</link>
    </feed>
   </controlChannel>
```

*FIG. 6*

CRAWLABLE APPLICATIONS

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to searching application data. More particularly, the present invention relates to an interface for crawling structured application data.

2. Description of the Related Art

As the use of networks expands, the use of enterprise applications is becoming more prevalent. An enterprise application is generally a software application hosted on a server which has the capability of simultaneously providing services to a large number of users on a network. Often, an enterprise application is suitable for performing business-related functions. Business-related functions may include, but are not limited to, tracking customer information, accounting, and production scheduling.

It is desirable to search for information that may be stored in or otherwise associated with applications or enterprise applications. The current methods of searching data require a search engine to first collect the content from diverse sources and then to text-index the content. The process of collecting the content is known as crawling. The structure of application data poses numerous challenges for crawling and indexing, and later searching the data. Application data is often times highly structured, for example, a single business object may span multiple tables in a database. Current methods of sourcing structured data include a search engine crawler plug-in. The crawler plug-in is designed to fetch documents of a data source type that is not supported by any of the search engine defined data source types. To create a plug-in, the user must become familiar with the architecture of the search engine crawler and the crawler plug-in, and decide upon an appropriate data source model, which sets out the attributes that are to be extracted. The user then programs the crawler plug-in to implement the data source model.

However, the plug-in framework is not a satisfactory solution for enabling the search of highly structured data. The plug-in framework is business object-dependent. Essentially, the plug-in code is confined to extract the attributes of a particular data source model associated with a business object. As such, there is a significant amount of overhead in the individual implementation of each business object. Where the number of business objects to be crawled, indexed, and searched is large, individual implementation may not be a viable solution. Hence, although information is likely to be successfully crawled using the plug-in framework, the steps associated with creating the plug-in may be complicated and time-consuming. Additionally, the crawler is fixed to the business object structure defined at the time of creation of the crawler. When there are subsequent changes to the structure of the business object and the crawler is not aware of the modification, the crawler is inoperable to crawl the business object.

Moreover, each plug-in is search engine-dependent. The crawler plug-in code must conform to the APIs (application programming interfaces) of the particular search engine. In order to implement the search capabilities using different search engines for an applications suite, the user must become familiar with the architecture of each search engine crawler and each search engine plug-in, and must write the plug-in code to comply with the APIs of each respective search engine.

Current solutions are not accessible for all types of applications. For example, plug-ins are dependent upon the applications for which they are targeted to access. Every application, or suite of applications, requires a plug-in to rely on the particular library files for the application. If a plug-in relies on the library of one application, the same plug-in may not be operable to crawl another application without experiencing significant deployment difficulty in merging the disparate applications.

Furthermore, the plug-in framework requires the internal structure of the business object and the execution context to be exposed to the search engine. The internal structure of enterprise applications may be proprietary. Accessing the highly structured application data, where the application data is proprietary, normally occurs through the Java Data Base Connectivity (JDBC) Application Programming Interface (API). A JDBC API is a standard Structured Query Language (SQL) database access interface on which crawlers may be based. Under this methodology, the crawler plug-in includes an SQL query or form-based query to retrieve the required data from the database. When the SQL statement is executed, the proprietary application data is exposed. Accordingly, through the JDBC connection, all of the proprietary data is available to be retrieved. This type of exposure could have serious implications on the application architecture with regard to deployments, dependency, performance, and usability. Although enterprise search engines have implemented various security policies, there are no solutions which control the exposure of application data on the applications side.

BRIEF SUMMARY OF THE INVENTION

Systems and methods in accordance with various embodiments of the present invention provide for a computer based method for crawling application data from an application data store. The applications data store has a plurality of business objects of an application stored thereon. Such a method can include identifying a first request for application data received from a search engine as a seed universal resource locator (URL) sourcing a business object of the plurality of business objects of the application. The method also can include accessing a crawlable definition for the identified business object, the crawlable definition including a way of extracting information from a complex structure of related business objects, such as a query selecting one or more attributes of the business object. Moreover, the method can include sending the query to the application data store and receiving query results in response thereto. Additionally, the method can include forming a crawlable document, including the retrieved results of the business object, to generate a data feed. The method can also include generating a control feed by dividing the data feed into transferrable batches and creating batch URLs for the batches and returning a feed document to the search engine, the feed document comprising the control feed.

In another embodiment, the feed document further includes the data feed. In yet another embodiment, the method includes identifying a second request for application data received from a search engine as a re-entry URL. The method also includes returning a batch from the data feed where the batch requested in the re-entry URL, returning a related document where the related document is requested in the re-entry URL, and returning a dependent document where the dependent document is requested in the re-entry URL.

A method in accordance with various embodiments of the present invention provides for a computer based method for enabling structured application data to be crawled via a user interface for the development of a crawlable business object definition. The user interface includes providing a data source field for user input within a display window to set a data source definition for a business object of a plurality of business objects of an application, where the data source definition includes a way of extracting information from a complex structure of related business objects, such as a query selecting one or more attributes of the business object to be exposed to a search engine. The user interface also includes providing a plurality of user input fields corresponding to a first set of metadata tags to specify how each attribute of the one or more selected attributes of the business object is to be crawled by the search engine, where the first set of metadata tags include a mapping metadata tag to identify an attribute of the one or more selected attributes to be mapped to a document structure persisted in the search engine.

A further understanding of the nature and the advantages of the inventions disclosed herein may be realized by reference of the remaining portions of the specification and the attached drawings.

BRIEF DESCRIPTION OF THE DRAWINGS

The invention may best be understood by reference to the following description taken in conjunction with the accompanying drawings in which:

FIG. 1 is a tabular representation of an exemplary business object associated with an enterprise application.

FIGS. 4A and 4B are XML code of an exemplary structure of a crawlable definition in accordance with one embodiment.

FIG. 5 is XML code of an exemplary structure of a data feed in accordance with one embodiment.

FIG. 6 is XML code of an exemplary structure of a control feed in accordance with one embodiment.

DETAILED DESCRIPTION

Figure 2:
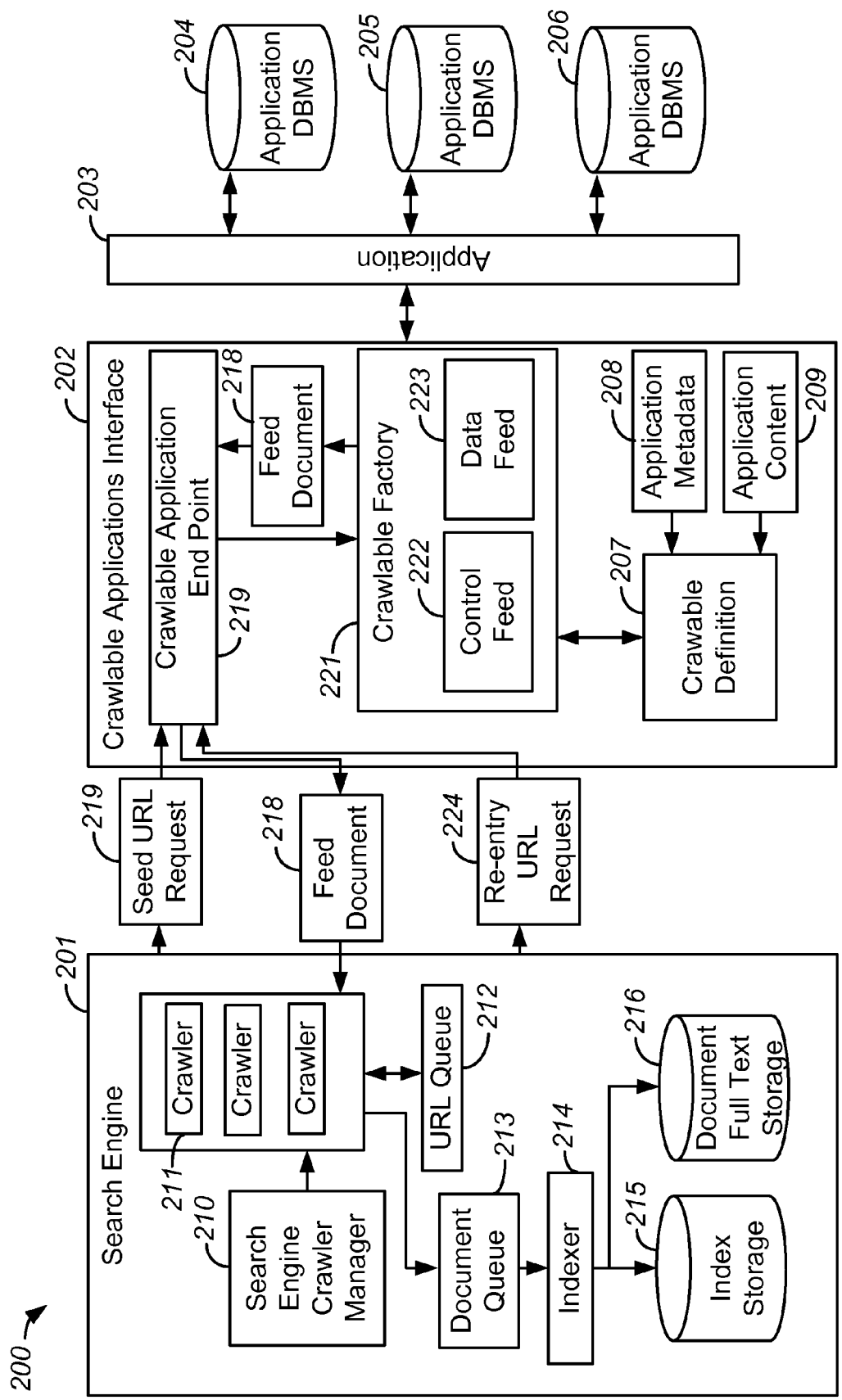
FIG. 2 is a diagrammatic representation of a system in which a crawlable application interface between a search engine and an application allows application data to be crawled in accordance with one embodiment.

In the description that follows, the present invention will be described in reference to embodiments of subsystems on a platform for a software application, such as a database application. However, embodiments are not limited to any particular architecture, environment, application, or implementation. For example, although embodiments will be described in reference to network database applications, the invention may be advantageously applied to any software application. Therefore, the description of the embodiments that follows is for purposes of illustration and not limitation.

Searches for highly structured data associated with enterprise applications are generally not readily crawlable by search engines. Although some search engines provide customizable plug-in programs, those search engines generally require significant developmental efforts on the part of the end user before specific enterprise application data may be crawled and indexed. A framework which provides exposure of business objects to a full text generic search engine in an uniformed manner while maintaining security functions and which allows the generic search engine to crawl applications with highly structured data without requiring the use of plug-ins is provided.

Creating the framework for searching structured application data includes creating an interface between the application data and existing search engines, alleviating the need to augment the search engine itself. In one embodiment, an applications developer is provided with a user interface environment that is used to develop crawlable definitions, which are needed to integrate a particular application with a crawlable applications interface, which in turn, incorporates existing search engines. The crawlable definitions may be used by the crawlable applications interface to develop documents which are crawlable, e.g. can be grabbed by the search engine. The use of such crawlable definitions and crawlable applications interface leverages the existing functionality of high performance search engines, such as crawling, indexing, and searching any number of enterprise applications, without requiring significant development efforts on the part of a search engine developer.

FIG. 1 is a tabular representation of an exemplary business object associated with an enterprise application. Business objects, especially in the context of enterprise applications, can be highly structured in form. A structured business object is one in which the object may be defined across multiple databases, tables, attachments, and/or views, etc. A Purchase Order Requisition is an exemplary structured business object. In this example, the RequistionsSVO business object spans multiple tables in a database. As shown, this object is defined by a Requisition table in a purchase order schema and an Employee table in a human resources schema. The Requisition table is made up of the requisition_header_id, preparer_id, last_update_date, item_description, authorization_status, org_id, and segment1 columns. The Employee table is made up of an employee_number, last_name, first_name, title, email, person_id, effective_start_date, and effective_end_date columns/attributes. Both tables are populated with records and will be used throughout this description as a simple example to illustrate the teachings herein.

FIG. 2 is a diagrammatic representation of a system in which a crawlable application interface between a search engine and an application allows application data to be crawled in accordance with one embodiment. System 200 includes a search engine 201, which may be substantially any search engine, such as one used to search application 203. Application 203 may be any of a number of enterprise applications, for example, such as business intelligence applications, analytic applications, customer relationship management (CRM) applications, financial management applications, governance, compliance and risk management applications, human capital management applications, procurement applications, project management applications, and supply chain management applications, although it should be appreciated that application 203 may be widely varied. Application 203 may also include any integrated suite of applications. In one embodiment, search engine 201 is a generic search engine, such as, but not limited to, a SQL search engine, an open source based search engine such as Apache Lucene, or Oracle Secure Enterprise Search available from Oracle Corporation of Redwood Shores, Calif.

Crawlable Applications Interface 202 is arranged between search engine 201 and application 203 and produces a document representing the application data which is crawlable by the search engine 201. That is, Crawlable Applications interface 202 effectively serves as a two-way translator between search engine 201 and application 203 such that search engine 201 may crawl and index, and later search, information associated with application 203. The application data may be stored in applications tables or views, such as in an application data store, e.g., applications (database management system) DBMS 204, 205, 206.

The application data can be made to be crawlable by providing a crawlable definition 207 of a business object of the application 203. In one embodiment, each business object is associated with its own crawlable definition 207. Alternatively, multiple business objects may be associated with a single crawlable definition 207 or a single business object may be associated with multiple crawlable definitions 207. In one embodiment, an applications developer is provided with a user interface that may be used to develop the crawlable definition of the business object, thus deciding how and to what degree the business object will be exposed to the search engine 201. An Integrated Development Environment (IDE) such as JDeveloper is an exemplary platform for developing the crawlable definitions. In one embodiment, Oracle Application Framework (OAF) is used as the foundation for building such definitions. Complex data mapping and transformation for business objects may be created using OAF.

Figure 3:
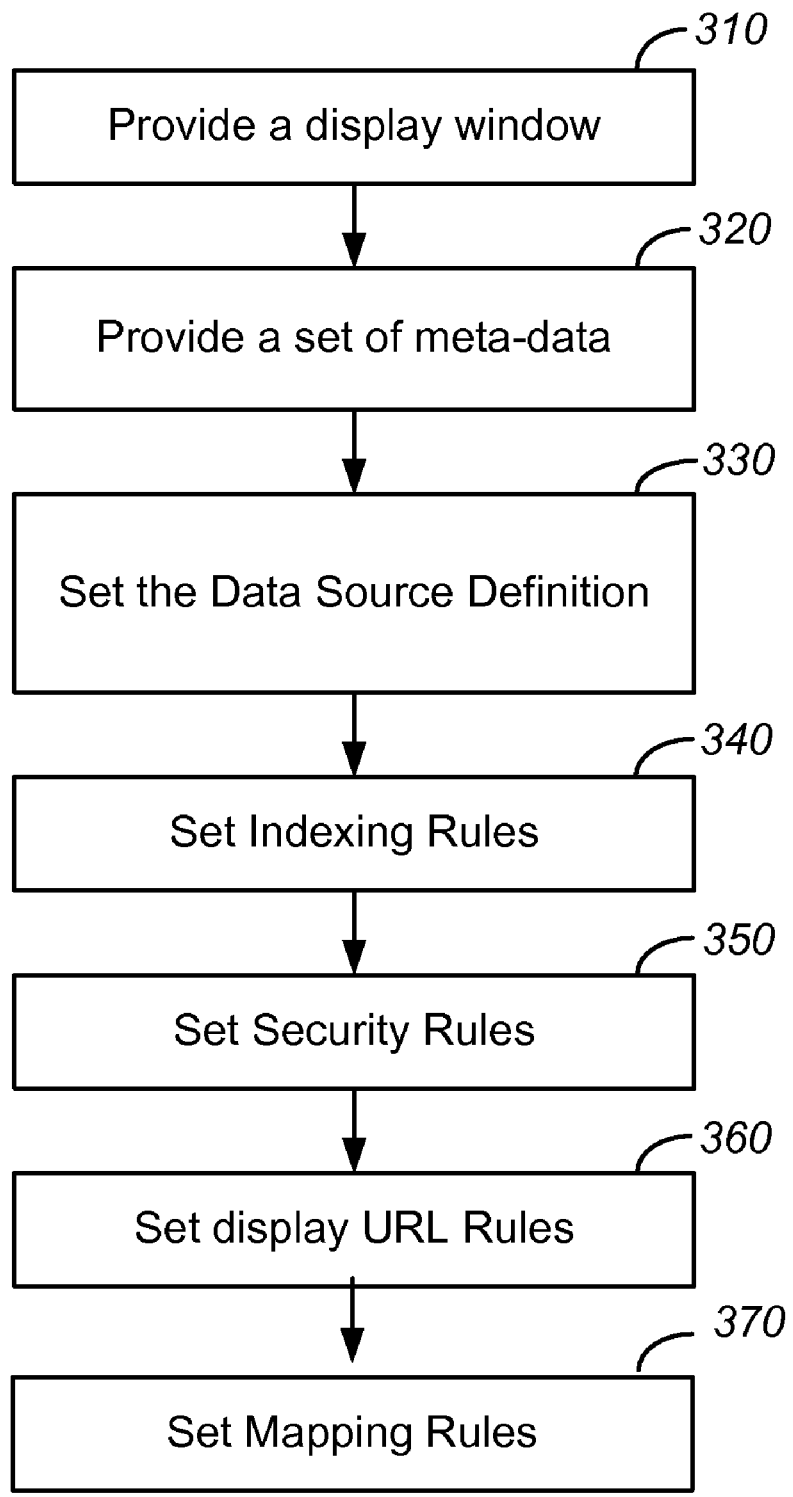
FIG. 3 is a process flow diagram which illustrates one method of providing a user interface for the development of a crawlable definition.

FIG. 3 is a process flow diagram which illustrates one method of providing a user interface for the development of a crawlable definition. In step 310, a display window that provides a user interface for designing the crawlable definition is provided. In step 320, the crawlable applications interface 202 provides a set of metadata tags. The metadata tags enable the user, such as the applications developer, to decide which application data to pull from the application DBMS 204, 205, 206, and to set indexing rules, security rules, display URL rules, and to map the application data to a document structure pertained by search engines, such as index storage 215. In one embodiment, any number of the preceding metadata tags are provided to the user. The metadata tags may be provided on the display window through various fields. In one method, the display window provides pull-down or pop-up menus or fields. The menus include a list of the metadata tags that are available. Other methods include, but are not limited to, providing the user interface in the form of a wizard, leading the user through a step-by-step construction of the crawlable definition. In another method, the display window provides a user interface with a number of user-input areas, where each area corresponds to a metadata tag, into which a user-defined string may be entered, e.g., by a user using a keyboard input. It should be appreciated that the fields may also be populated using other methods.

In step 330, a data source definition is set by forming a query to access the application data in the application DBMS 204, 205, 206. In one embodiment, the query is written in SQL. The user, such as the applications developer, is acquainted with the structure of the business object. The user may selectively decide which elements of the business object to expose to the search engine by writing a query to retrieve those specific elements. For example, referring back to FIG. 1, the Purchase Order Requisition business object includes the Requisition table and the Employee table. The Employee table includes a Social Security Number (SSN) attribute. FIGS. 4A and 4B are XML code of an exemplary structure of a crawlable definition in accordance with one embodiment. Within the <SQLQuery> metadata tags, an exemplary SQL statement is provided. The user selects a number of attributes from the Employee table in FIG. 1 to expose to the search engine 201. However, the Employee.SSN attribute is not selected and will not be retrieved. Accordingly, the search engine will not have access to the Employee.SSN attribute with regard to the Purchase Order Requisition business object. By controlling the business object on the applications-side, the applications developer, through the crawlable definitions, can also manage any changes to the structure of the business object.

In step 340 of FIG. 3, indexing rules are set using the provided metadata tag. The indexing rules specify whether the textual body of an attribute will be crawlable by the search engine. Referring back to FIGS. 4A and 4B, properties are defined for the selected attributes of the business object. The property CRAWL_IS_INDEXED for the RequisitionHeaderId attribute is defined as "true." Accordingly, the body of the text of the RequisitionHeaderId attribute will be made to be crawlable by the search engine. However, the property CRAWL_IS_INDEXED for the PreparerId attribute is defined as "false." Accordingly, this attribute will not be crawlable by the search engine.

In step 350 of FIG. 3, the user sets security rules using the provided metadata tag. An attribute for which the security tag is set is deemed to be a security attribute. Referring back to FIGS. 4A AND 4B, the property CRAWL_IS_SECURE for the PersonId attribute is defined as "true." Accordingly, the security attribute for the RequisitionsSVO business object is the PersonId attribute. In an alternative embodiment, the security attribute is set using an Access Control List (ACL), any other known security means, or combinations thereof.

In step 360 of FIG. 3, display URL rules are set using the provided metadata tag. A display URL is a URL string used for search result display. This is the URL used when an end user of the search engine clicks a search result link provided by the search engine after the end user supplies a query. Referring back to FIGS. 4A AND 4B, the property CRAWL_IS_DISPLAYED for the RequisitionHeaderId attribute is defined as "true." Accordingly, this attribute value will be included in the display URL. The property CRAWL_IS_DISPLAYED for the PreparerId attribute is defined as "false." Accordingly, this attribute will not be displayed in the display URL.

In step 370 of FIG. 3, the rules for mapping to a document structure pertained by the search engines are set. As previously stated, the application data may be highly structured. This rule maps attributes of the search engine index to the source attributes or properties of the application data. The attributes of the business object may be set to be stored in the search engine index. Referring back to FIG. 4, the property CRAWL_IS_STORED for the RequisitionHeaderId attribute is defined as "true." Accordingly, this attribute will be mapped to the search engine.

Referring back to FIG. 2, the crawlable definitions 207 described above are stored within the crawlable applications interface 202. In alternative embodiments, the crawlable definitions 207 may be stored elsewhere as would be apparent to one of ordinary skill in the art. After the crawlable definitions 207 have been determined, the search engine 201 may begin the process of crawling the application data. The application 203 in this example is a search source for the crawler. In one embodiment, application 203 is sourced by a crawler plug-in. Rather than designing the plug-in around a single business object, which is highly time-consuming to implement for many business objects, the entire application 203 may be sourced with a crawlable entry point, such as a seed URL. Prior art methods of creating a plug-in to source applications required additional information, such as repository access data. For a database, prior art methods required the database connect string and the schema name and password. In alternative embodiments, the application 203 may be sourced by a plug-in targeted for a subset of the all the business objects comprising the application 203. For example, a single business object may be sourced through the plug-in.

After application 203 has been sourced, the search engine 201 sends a seed URL request 219 to the crawlable applications interface 202. A virtual network between the search engine 201 and the crawlable applications interface 202 allows the application 203 to be crawled over existing Hyper Text Transfer Protocol (HTTP) or Hyper Text Transfer Protocol Secure (HTTPS). As previously described, accessing application data normally occurs through JDBC, thus exposing the proprietary application data to the search engine. By allowing the search engine crawler 211 to access the application data through the provided HTTP or HTTPS endpoints, or URLs, the application data is exposed to the degree the applications developer dictates in the crawlable definition. In this way, the protection of the application data is accomplished on the applications-side.

A crawlable application endpoint 219 of crawlable applications interface 202 receives the seed URL request 219 from the search engine 201. The crawlable endpoint 219 is a web service that performs two functions. First, when the crawlable endpoint 219 receives the seed URL request 219, the crawlable endpoint sends a request to crawlable factory 221 to generate control feed 222 and data feed 223. Second, the crawlable endpoint 219 provides a web accessible secure end point, or URL, that is crawlable to external search engines through a defined messaging protocol, such as HTTP(S). This web service provides crawlable data sets to the search engine crawlers for indexing and later for searching.

Crawlable factory 221 is a software module that performs three functions. The first is to create data feed 223. Once the crawlable factory 221 receives the request to create the data feed 223, the crawlable factory 221 accesses the crawlable business objects specified in the crawlable definition 207. In one embodiment, the factory 221 accesses the definitions of the business objects that were specifically sourced. As previously described, the crawlable definition 207 includes all or a subset of the business objects of the application 203. For each of the crawlable business objects defined or sourced, the factory 221 queries the data source as defined in the business object crawlable definition, for example as a SQL query, and retrieves the records of the business object from the data source. Each record is an instance of the business object. In one embodiment, the business object data can be read directly from application 203 tables and/or views. Alternatively, the business object data can be staged in interface tables as needed using SQL, such as application content staging table 209.

The crawlable factory 221 forms a crawlable document for each retrieved record of the business object. The crawlable document includes the data for each record. In another embodiment, the crawlable document is comprised of one or more records. The crawlable factory makes use of the search-related application metadata 208 to create the documents. Recall, the metadata 208, which may reside within the crawlable definition, includes metadata tags for the attributes of the business object. In one embodiment, the documents are written in XML. The crawlable factory 221 compiles the data feed by numbering the documents into a larger document that contains those records/instances. Each instance of the business object may contain any of the following sections: metadata including security rights, searchable objects to be indexed, dependent document URLs, and related searchable object URLs. These sections will be discussed with regard to FIG. 5.

FIG. 5 is XML code of an exemplary structure of a data feed in accordance with one embodiment. The metadata values include multiple attributes of the business object and a link to the data feed among other tags and values. The security rights are provided for the record under the securityAttribute tag. In this example, the applications developer set the PERSON_ID as security attribute in the definition of FIGS. 4A AND 4B. Accordingly, the value of the security attribute, "25", is provided in the data feed. Additionally, an access control list key ACL_KEY was also set as a security attribute. The value, "xyz100001x", is also provided in the data feed. Thus, the PERSON_ID and the ACL_KEY attributes form the security attributes which guard this business object instance. The attribute names are previously defined in the crawlable definition. The searchable object to be indexed, in this example, has primary key 17215. The exemplary searchable object is one of many possible records that were returned from the data store after execution of the SQL statement. The dependent document URLs, for example attachments, are shown under the contentLink metadata tag. In this example, the data feed includes a link to an attachment. Related URLs may also be included. In one embodiment, the crawlable factory 221 is also responsible for ensuring there are no cyclic issues for the related URLs.

Referring back to FIG. 2, the second function of the crawlable factory 221 is to generate control feed 222. The factory 221 creates the control feed 222 by splitting the large volume of the data feed into batches, where each batch represents a re-entry URL of a data feed. In one embodiment, the crawlable data in the data feed is split into transferable batches. Each batch can be transferred over the defined messaging protocol, such as HTTP(S). In most cases, the crawlable data will be very large in volume, including instances of crawlable business objects. The defined messaging protocol may place limits on the size of crawlable application data that is made available through the crawlable endpoint 219. It is not practical to send a large volume of data in one request over HTTP(S), for example. Accordingly, the application data is split into batches.

The crawlable factory creates batch URLs for each batch. FIG. 6 is XML code of an exemplary structure of a control feed in accordance with one embodiment. The control feed URL is identified with the <link> metadata tag, with the value RequisitionsSVO/ControlFeed. The batch URLs may be identified by a feed identifier. The batch URL for the feed is provided with the <link> metadata tag, following the feed identifier. Accordingly, the control feed 222 is similar to a queue or a list of links, where each link represents a batch of documents.

Referring back to FIG. 2, the third function of the crawlable factory 221 is to return a feed document 218 to the crawlable endpoint 219. In one embodiment, the feed document 218 is made up of the control feed 222. Accordingly, the feed document 218 represents the batches of all or a subset of the business objects within the application 203. The crawlable endpoint 219 returns the feed document 218 to the search engine 201. In an alternative embodiment, the feed document 218 is made up of a combination of the data feed and the control feed, in whole or in part, and is returned to the search engine 201 in response to the seed URL request. A feed document has two sections, a data feed section and a control feed section. The control feed section contains a list of re-entryable URLs for more data feeds. The data feed section contains data that are instances of the business object. These two sections do not have to be related, although they may be. For example, if a re-entry URL requests a data set and the crawlable factory decides that the volume is too large for the request, a document would be formed that has a data feed section that contain the first 100 records, and the rest may be broken down into small data feed URLs in the control feed section. The feed document 218 may be an Extensible Markup Language (XML) document.

On the search engine 201 side, the feed document 218 is crawled through generic methods. In one embodiment, the search engine 201 determines if the feed document 222 has content to be indexed or has further links to other documents. If the search engine 201 finds links, the search engine pushes those links into a job queue, such as URL queue 212. Where the feed document 218 includes the control feed, the search engine 201 pushes the list of batch links onto the URL queue 212. Where the feed document includes the data feed, the search engine may determine there is content to be indexed and push the content to a document queue 213. The data feed may also includes further links such as related searchable object links and/or dependent links. These further links are pushed onto the URL queue 212. It should be appreciated that processing of links, such as those found in the feed document 218, may vary widely according to the implementation of the search engine 201. Further, it should be appreciated that processing of content, such as that found in the batch URL, dependent document URL, related URL, etc., may vary widely according to the implementation of the search engine 201.

At this point, the search engine crawler manager 210 spawns multiple threads or crawlers 211 to crawl the sites listed in the URL queue 212. The crawler 211 can send a request for a re-entry URL 224, which is a URL other than a seed URL. For example, a re-entry URL may include a batch URL, related URL, or a dependent document URL. The crawlable application endpoint 219 receives the re-entry URL request 224 from the search engine crawler 211. The requested batch is returned to the search engine 201, where the re-entry URL is a batch URL. The requested related document is returned, where the re-entry URL is a related URL. The requested dependent document is returned, where the re-entry URL is a dependent document URL.

Further, the contents of the document queue 213 may be indexed at indexer 214. Following indexing, the application data is stored in indexed-form in the index storage 215. In alternative embodiments, the entire document within the document queue is stored in the document full text storage 216. The application data has been successfully crawled and is available for searching by an end user.

Figure 7:
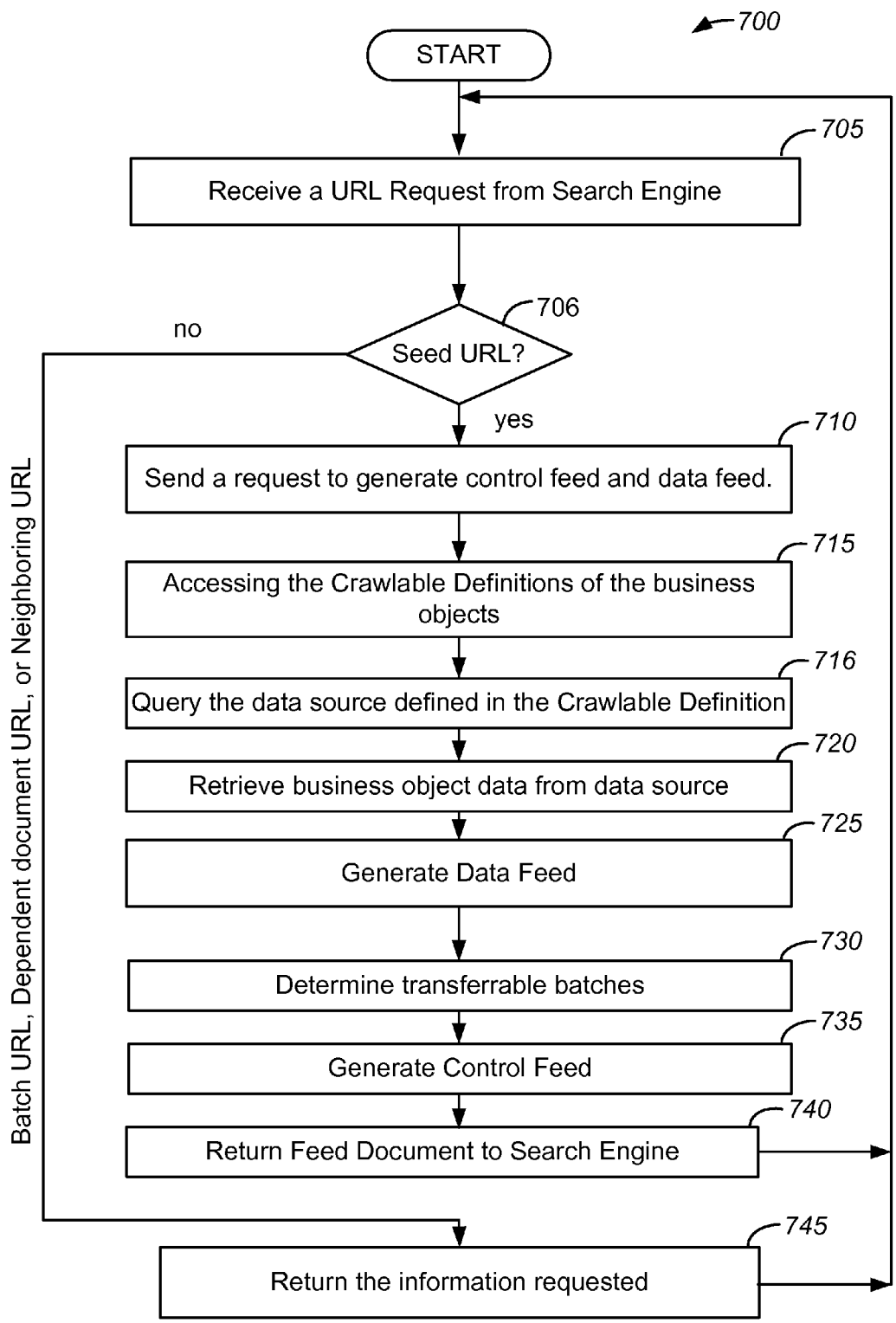
FIG. 7 is a process flow diagram which illustrates one method of crawling application data in accordance with one embodiment.

FIG. 7 is a process flow diagram which illustrates one method of crawling application data in accordance with one embodiment. A process 700 of crawling application data by a crawlable applications interface begins at block 705 in which the crawlable applications interface receives a URL request from the search engine. At block 706, it is determined whether the URL request is a seed URL. If so, processing continues to block 710. If it is determined that the request of block 705 is one for a URL other than a seed URL, such as a batch URL, dependent document URL, related URL, etc., processing continues to block 745. Alternatively, there may be no distinction in processing of seed URLs and other URLs.

At block 710, the crawlable applications interface sends a request to the crawlable factory to generate a control feed and data feed. At block 715, the crawlable applications interface begins to generate the data feed by accessing the crawlable definitions of business objects for the application. In one embodiment, a subset of all the crawlable definitions is accessed, such as when specific business objects are sourced. The data feed provides crawlable data representing business object instances. At block 716, the data source defined in the crawlable definition is queried. The crawlable definition includes a data source for the searchable object. In one embodiment, a query specified in the crawlable definition accesses the data source. The query may be an SQL query. The business object data is retrieved from the data source at block 720. At block 725, the crawlable factory generates the data feed. In one embodiment, the factory forms a document for each instance of the business object and numbers the documents into a larger document that contains all of the instances of the business object. This process is repeated for each crawlable business object of the application. In another embodiment, the process is repeated for the sourced business objects.

At block 730, the crawlable applications interface determines transferable batches. In order to accomplish this, the data feed is split into smaller sized batches. Each batch is of a size that would permit the batch to be transferred to a requesting entity, such as a search engine. The batch sizes may be identical, however uniformity is not required. In one embodiment, the batch sizes may be optimized during transmission. At block 735, the control feed is generated by creating batch URLs for each batch of application data. In one embodiment, the total number of documents, which represent the instances of the business objects of an application, is large, for example one million. The crawlable applications interface may determine that a batch size of 500 documents is transferable. Accordingly, 2,000 batch URLs are created, one URL for each batch. At block 740, a feed document is returned to the requestor, such as the search engine. As previously discussed, the feed document may be made up of any combination of the control feed and the data feed. In one embodiment, the feed document includes the control feed only. In another embodiment, the feed document includes both the control feed and the data feed.

Processing loops back to block 705, where the crawlable applications interface receives a URL request. In one embodiment, the feed document was made up of the control feed. As previously discussed, the control feed contains batch URLs. As such, the search engine pushed the batch URLs on the job queue and spawned multiple crawlers to grab the documents in the job queue. Each crawler grabs a job from the queue and makes a request for the batch URL. The crawlable applications interface determines if the request is one for a seed URL or for any other URL, for example a batch URL, dependent document URL, or related URL. If the URL requested is not a seed URL, processing continues to block 745, where the information that was requested is returned to the search engine. For a batch URL request, for example, an XML document corresponding to the batch of application data is returned. For a dependent document URL request, an XML document corresponding to a dependent document is returned. A dependent document may include an attachment. For a related searchable object URL request, an XML document corresponding to a related business object instance is returned. In an alternative embodiment, the preceding URLs provide any type of document which is crawlable by the search engine. The process terminates if the crawlable applications interface no longer receives URL requests from the search engine.

Figure 8:
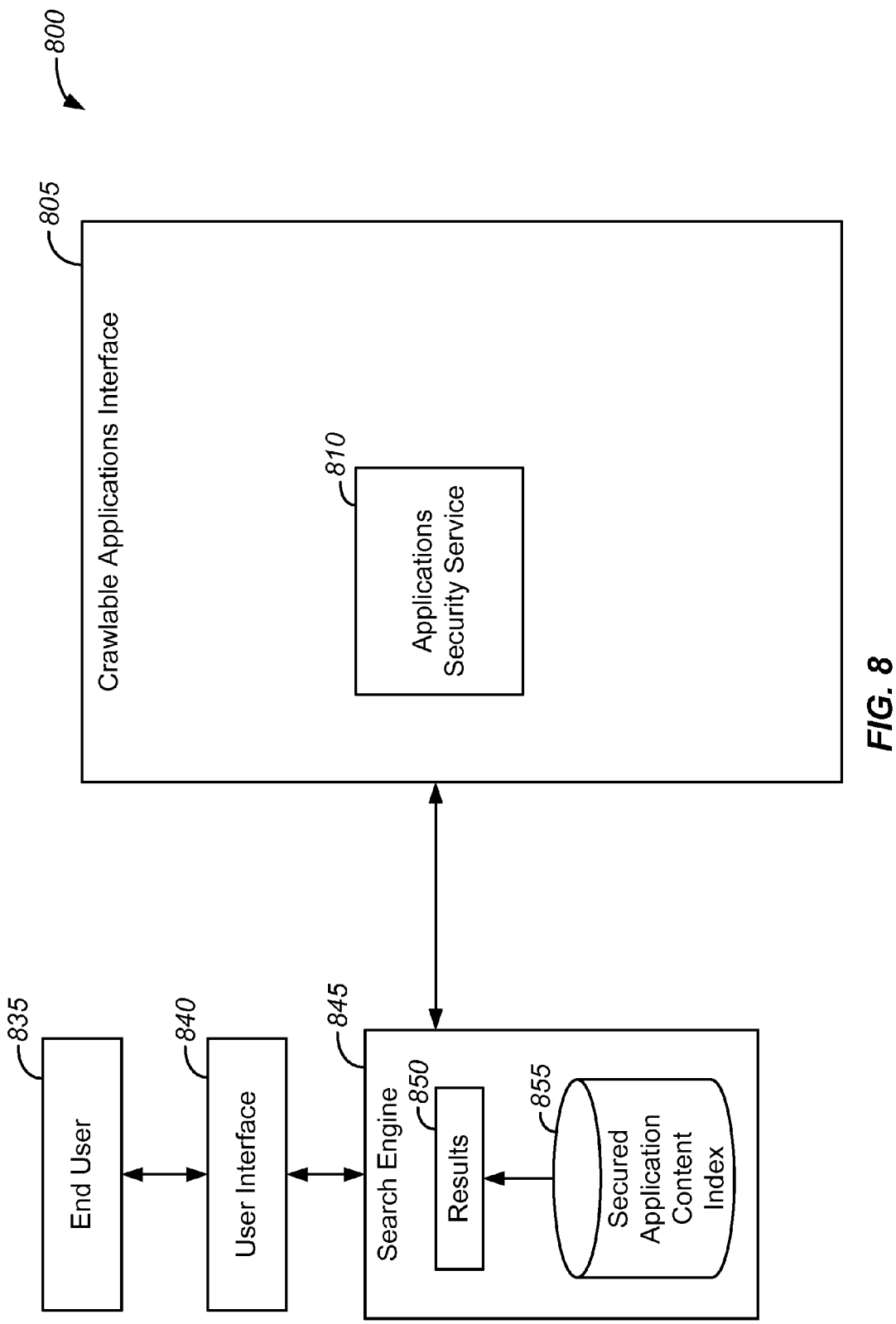
FIG. 8 is a diagrammatic representation of a system in which an interface between a search engine and an application allows the application data to be securely indexed and searched.

Prior methods of providing secure search services require the enterprise application to make their proprietary data available to the search engine. The enterprise application is entirely dependent on the search engine's security policies. Weak policies introduce a weaker link in the security chain. In one embodiment, application data which has been previously crawled and indexed into the search engine cannot be served out to an end user without security permissions from an applications security service on the applications side. FIG. 8 is a diagrammatic representation of a system in which an interface between a search engine and applications allows the application data to be securely indexed and searched. System 800 includes applications security service 810 which in this embodiment is a web service that pairs with crawlable applications interface 805 to provide authorization and authentication services. This web service ensures that the search engine 845 serves search results to end user 835 with proper security measures. In one embodiment, the security service 810 communicates through a defined messaging protocol, such as HTTP(S). The implementation of the security service 810 is not limited to any particular search engine.

The secure search begins by authentication of an end user 835. Authentication is enforced when the end user 835 requests a protected application area. The search engine 845 authenticates the end user 835 through the applications security service 810, if the end user 835 has not previously been authenticated. The search engine 845 provides a login dialog for end user 835 identification. In one embodiment, authentication is accomplished by using a browser login dialog for the end user 835 to enter a username and password. The search engine 845 sends a request to the applications security service 810 to authenticate the end user 835 by providing the end user 835 login information. In one embodiment, this is performed over HTTP as a web service call by sending an XML document including the login information. The applications security service 810 returns an acceptance or denial of the end user 835 as a valid user of the application.

After authentication, the end user 835 may enter a search query. The user interface 840 may provide a list of searchable business objects. In one embodiment, the list of searchable business objects is limited based on the security rights of the end user 835. The end user 835 queries on one or more selected business objects. The user interface 840 passes the search query to the search engine 845 for authorization. The search engine 845 connects to the applications security service 810 to perform authorization. The process of authorization limits end user's 835 access to the application data. The applications security service 810 sends to the search engine, a key or a set of keys based on the end user and/or the business object to be queried. The keys are determined by the attributes that have been set in the crawlable definition, or through other designated security means. In the search engine, the indexed application data may be locked, and can be viewed with an authorized key. The search engine 845 rewrites the query to include the security predicates, such as the key or set of keys, obtained by the application security service 810. The search engine 845 issues the query to the secured application content index 855. As previously described, the applications developer may dictate the security requirements of the business object within the crawlable definition using the security metadata tags. These security requirements are indexed along with each document in the search engine index 855 after the documents have been crawled. The query is set to retrieve the records with attribute values which match the key. The index 855 returns the search results 850 to the search user interface 840. The search results 850 are displayed to the end user 835.

Figure 9:
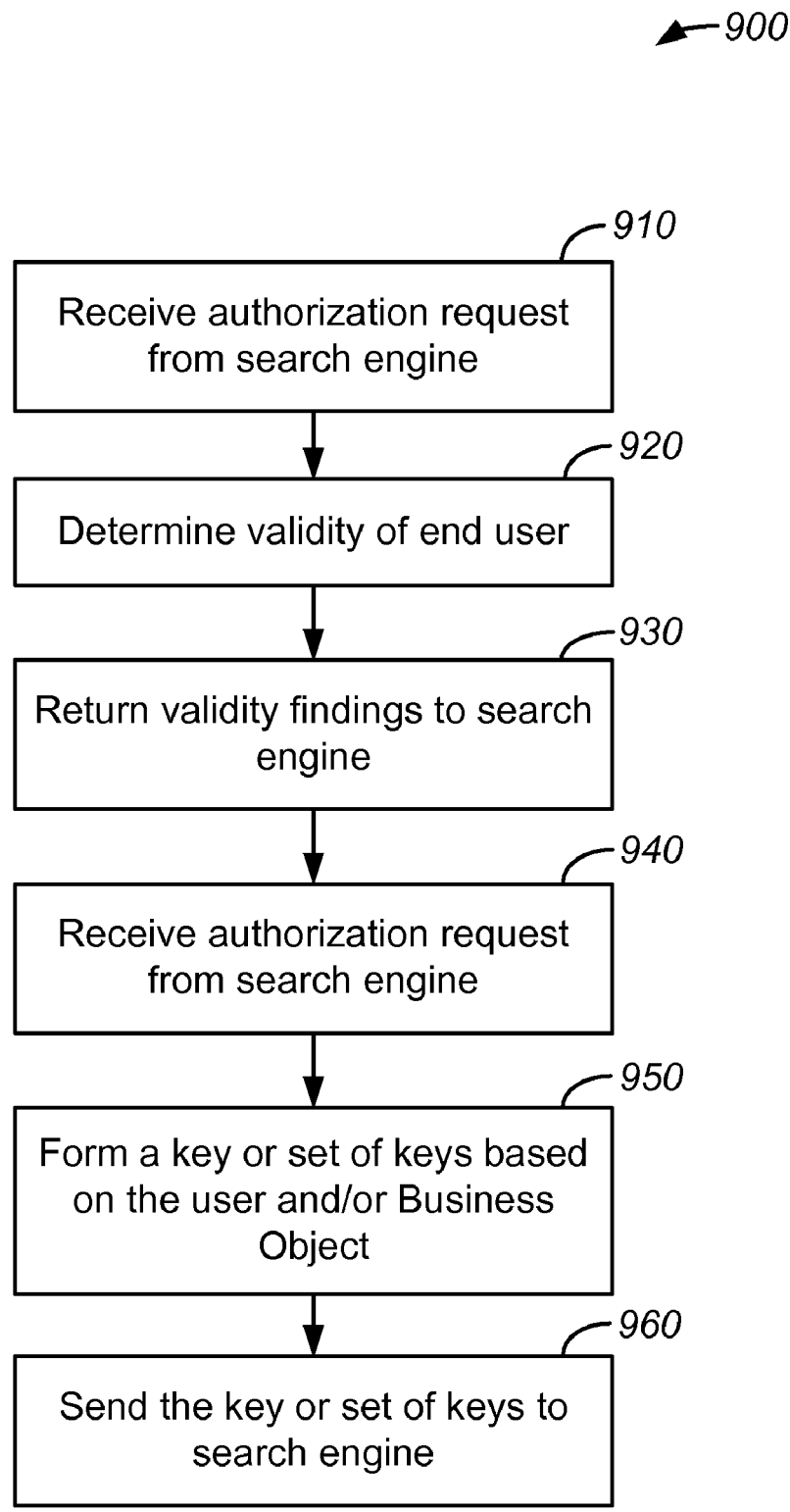
FIG. 9 is a process flow diagram which illustrates one method of providing secured search of structured application data.

FIG. 9 is a process flow diagram which illustrates one method of providing secured search of structured application data. A process 900 of providing secured search by a crawlable applications interface begins at block 910 in which applications security service receives an authentication request from a search engine. In block 920, the security service determines the validity of the end user. In one embodiment, the end user desires access to secure application data. Rather than conferring this responsibility to the search engine, the applications security service accepts or denies the end user access to the application data. Authentication is performed for each module in the application against a security model. In alternative embodiments, the search engine performs authentication, or the end user has previously been authenticated. At block 930, the security service returns the validity findings to the search engine. At block 940, an authorization request is received from the search engine. At block 950, the security service forms a key or a set of keys based on the user and/or business object. It should be understood that the step of forming the keys is a matter of implementation to be decided by the applications developer. The key may be based on the qualities or attributes of the end user and/or the business object(s) to be accessed, as well as other criteria. A single key may be formed. In an alternative embodiment, multiple keys are formed. At block 960, the security service sends the key or set of keys to the search engine.

Figure 10:
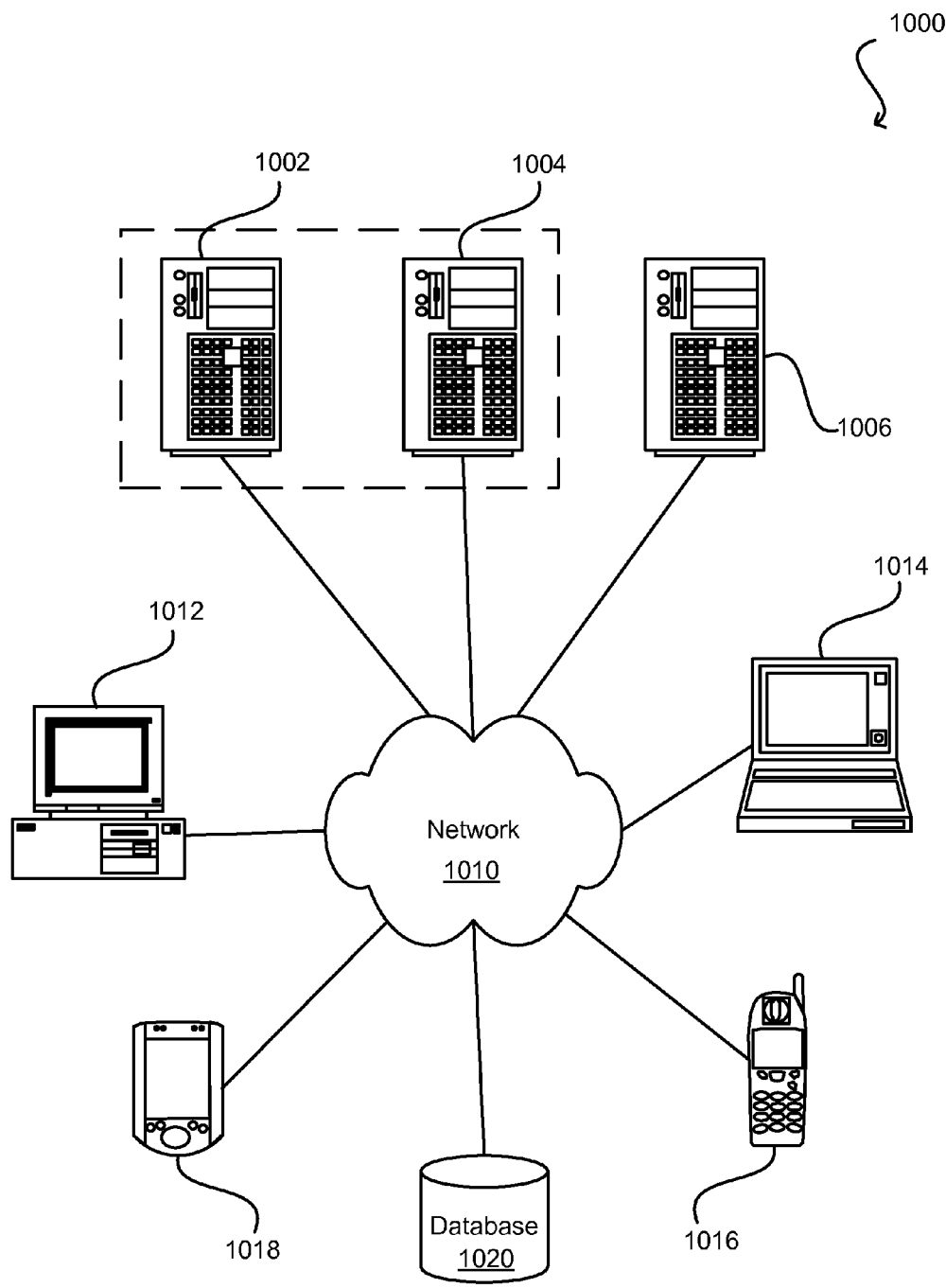
FIG. 10 is a block diagram illustrating components of an exemplary operating environment in which various embodiments of the present invention may be implemented.

FIG. 10 is a block diagram illustrating components of an exemplary operating environment in which various embodiments of the present invention may be implemented. The system 1000 can include one or more user computers, computing devices, or processing devices 1012, 1014, 1016, 1018, which can be used to operate a client, such as a dedicated application, web browser, etc. The user computers 1012, 1014, 1016, 1018 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 1012, 1014, 1016, 1018 may also have any of a variety of applications, including one or more development systems, database client and/or server applications, and Web browser applications. Alternatively, the user computers 1012, 1014, 1016, 1018 may be any other electronic device, such as a thin-client computer, Internet-enabled gaming system, and/or personal messaging device, capable of communicating via a network (e.g., the network 1010 described below) and/or displaying and navigating Web pages or other types of electronic documents. Although the exemplary system 1000 is shown with four user computers, any number of user computers may be supported.

In most embodiments, the system 1000 includes some type of network 1010. The network may can be any type of network familiar to those skilled in the art that can support data communications using any of a variety of commercially-available protocols, including without limitation TCP/IP, SNA, IPX, AppleTalk, and the like. Merely by way of example, the network 1010 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 1002, 1004, 1006 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 1006) may be dedicated to running applications, such as a business application, a Web server, application server, etc. Such servers may be used to process requests from user computers 1012, 1014, 1016, 1018. The applications can also include any number of applications for controlling access to resources of the servers 1002, 1004, 1006.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1012, 1014, 1016, 1018. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 1012, 1014, 1016, 1018.

The system 1000 may also include one or more databases 1020. The database(s) 1020 may reside in a variety of locations. By way of example, a database 1020 may reside on a storage medium local to (and/or resident in) one or more of the computers 1002, 1004, 1006, 1012, 1014, 1016, 1018. Alternatively, it may be remote from any or all of the computers 1002, 1004, 1006, 1012, 1014, 1016, 1018, and/or in communication (e.g., via the network 1010) with one or more of these. In a particular set of embodiments, the database 1020 may reside in a storage-area network ("SAN") familiar to those skilled in the art. Similarly, any necessary files for performing the functions attributed to the computers 1002, 1004, 1006, 1012, 1014, 1016, 1018 may be stored locally on the respective computer and/or remotely, as appropriate. In one set of embodiments, the database 1020 may be a relational database, such as Oracle 10g, that is adapted to store, update, and retrieve data in response to SQL-formatted commands.

Figure 11:
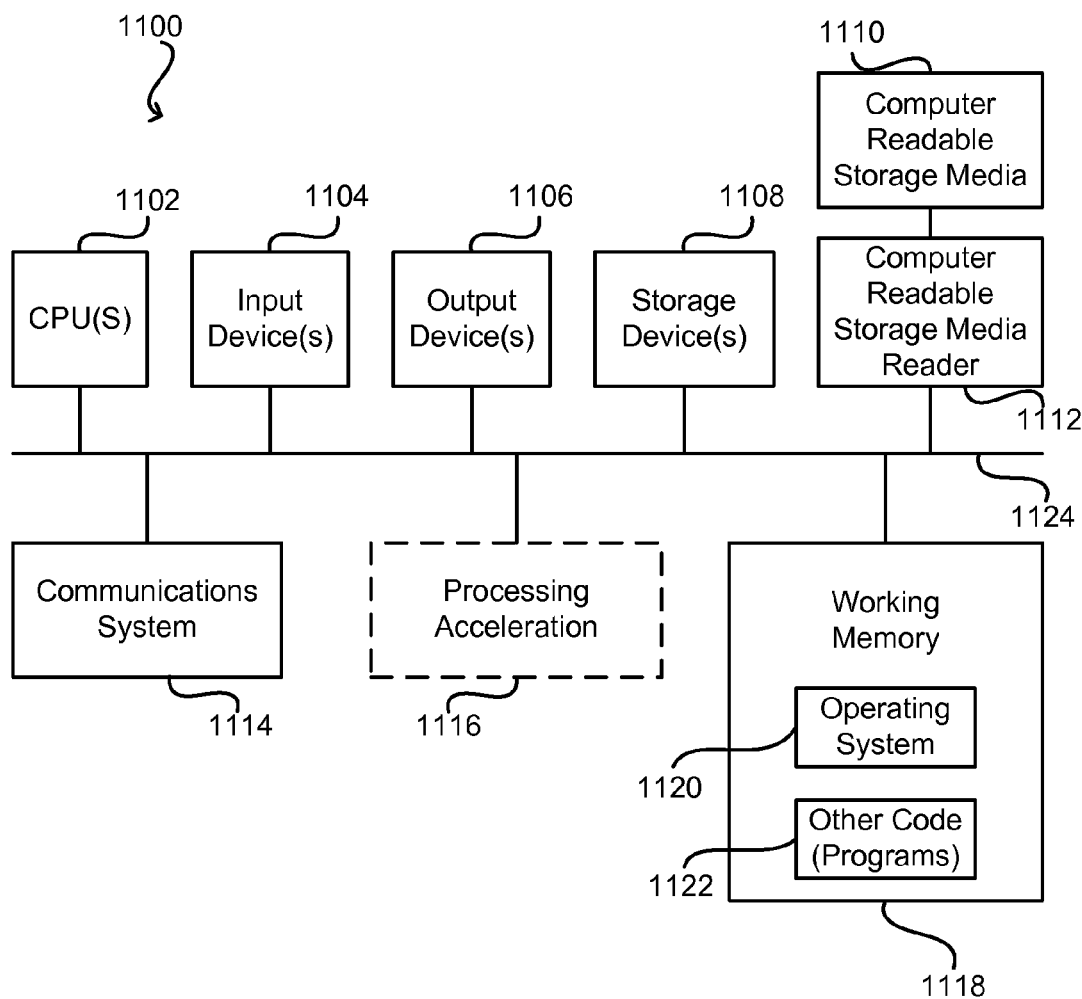
FIG. 11 illustrates an exemplary computer system 1100, in which various embodiments of the present invention may be implemented.

FIG. 11 illustrates an exemplary computer system 1100, in which various embodiments of the present invention may be implemented. The system 1100 may be used to implement any of the computer systems described above. The computer system 1100 is shown comprising hardware elements that may be electrically coupled via a bus 1 124. The hardware elements may include one or more central processing units (CPUs) 1102, one or more input devices 1104 (e.g., a mouse, a keyboard, etc.), and one or more output devices 1106 (e.g., a display device, a printer, etc.). The computer system 1100 may also include one or more storage devices 1 108. By way of example, the storage device(s) 1108 can include devices such as disk drives, optical storage devices, solid-state storage device such as a random access memory ("RAM") and/or a read-only memory ("ROM"), which can be programmable, flash-updateable and/or the like.

The computer system 1100 may additionally include a computer-readable storage media reader 1112, a communications system 1114 (e.g., a modem, a network card (wireless or wired), an infra-red communication device, etc.), and working memory 1118, which may include RAM and ROM devices as described above. In some embodiments, the computer system 1100 may also include a processing acceleration unit 1116, which can include a digital signal processor DSP, a special-purpose processor, and/or the like.

The computer-readable storage media reader 1112 can further be connected to a computer-readable storage medium 1110, together (and, optionally, in combination with storage device(s) 1108) comprehensively representing remote, local, fixed, and/or removable storage devices plus storage media for temporarily and/or more permanently containing computer-readable information. The communications system 1114 may permit data to be exchanged with the network and/or any other computer described above with respect to the system 1100.

The computer system 1100 may also comprise software elements, shown as being currently located within a working memory 1118, including an operating system 1120 and/or other code 1122, such as an application program (which may be a client application, Web browser, mid-tier application, RDBMS, etc.). It should be appreciated that alternate embodiments of a computer system 1100 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The above description is illustrative but not restrictive. Many variations of the invention will become apparent to those skilled in the art upon review of the disclosure. While enterprise applications have generally been described as suitable for being crawlable using the crawlable applications interface, applications that are made to be crawlable are not limited to being enterprise applications. For example, an application that is not an enterprise application may be crawlable using the crawlable applications interface. The scope of the invention should, therefore, be determined not with reference to the above description, but instead should be determined with reference to the pending claims along with their full scope or equivalents.

What is claimed is:

1. A computer-implemented method for crawling application data from an application data store storing instances of business objects associated with an application, the method comprising:

identifying, with a processor of a computer system, a first request for application data received from a search engine as a seed universal resource locator (URL) sourcing a business object associated with the application for crawling by the search engine;

accessing, with the processor of the computer system, a crawlable definition for the business object associated with the application, the crawlable definition including information specifying a query selecting one or more attributes of the business object associated with the application;

receiving, at the computer system, query results in response to sending the query to the application data store;

forming, with the processor of the computer system, a crawlable document based on the query results, the crawlable document including information related to instances of the business object and corresponding to the one or more attributes of the business object from the query results;

generating, with the processor of the computer system, a data feed based on the crawlable document;

generating, with the processor of the computer system, a control feed based on dividing the data feed into a set of transferable batches according to predetermined criteria;

generating, with the processor of the computer system, batch URLs for transferable batches in the set of transferable batches;

returning a feed document to the search engine from the computer system, the feed document comprising the control feed and the batch URLs for the transferable batches in the set of transferable batches;

identifying, with the of the computer system, a second request for application data received from the search engine as a re-entry URL associated with the feed document;

returning, from the computer system, a batch from the data feed to the search engine where the batch is requested in the re-entry URL;

returning, from the computer system, a related document to the search engine where the related document is requested in the re-entry URL; and returning, from the computer system, a dependent document to the search engine where the dependent document is requested in the re-entry URL.

2. The method of claim 1, wherein identifying, with the processor associated with the computer system, the first request for application data received from the search engine as a seed universal resource locator (URL) sourcing a business object associated with the application comprises identifying the first request as a seed URL sourcing one or more business objects associated with the application.

3. The method of claim 1, wherein communication with the application data store is performed over a virtual network over a defined web enabled messaging protocol.

4. The method of claim 1, wherein the feed document further comprises the data feed.

5. The method of claim 1, wherein dividing the data feed into the set of transferable batches according to predetermined criteria comprises dividing the data feed into the set of transferable batches based on a size capable of being transferred over a defined web enabled messaging protocol.

6. The method of claim 1, wherein generating, with the processor associated with the computer system, the data feed based on the crawlable document further comprises generating the data feed based on the crawlable definition for the business object associated with the application.

7. A system for crawling structured application data of an application, the system comprising:

a first set of one or more computer systems configured to host a relational database configured to provide access to the application data stored in persistent storage associated with the first set of one or more computer systems;

a second set of one or more computer systems configured to host a search engine configured to crawl and index information about business objects associated with the application; and a third set of one or more computer systems configured as an interface logically arranged in communication between the database and the search engine, the interface configured to:

identify a first request for application data received from the search engine as a seed universal resource locator (URL) sourcing a business object associated with the application for crawling by the search engine, translate the first request into a query selecting one or more attributes of the business object associated with the application in response to accessing a crawlable definition for the business object associated with the application, the crawlable definition including information specifying the query and the one or more attributes of the business object associated with the application, receive query results from the database in response to sending the query the database, form a crawlable document based on the query results, the crawlable document including instances of business objects from the query results, generate a data feed based on the crawlable document, generate a control feed based on dividing the data feed into a set of transferable batches according to predetermined criteria, generate batch URLs for transferable batches in the set of transferable batches, return a feed document to the search engine, the feed document comprising the control feed and the batch URLs for the transferable batches in the set of transferable batches, identify a second request for application data received from the search engine as a re-entry URL associated with the feed document, return a batch from the data feed to the search engine where the batch is requested in the re-entry URL, return a related searchable object to the search engine where the related business object is requested in the re-entry URL, and return a dependent document to the search engine where the dependent document is requested in the re-entry URL.

8. The system of claim 7, wherein the feed document is further comprised of the data feed.

9. The system of claim 7, wherein the seed URL sources one or more of the business objects of the application.

10. The system of claim 7, wherein communication with the application data store is performed over a virtual network over a defined web enabled messaging protocol.

11. The system of claim 7, wherein the interfaces is further configured to generate the set of transferable batches based on a size capable of being transferred over a defined web enabled messaging protocol.

12. The system of claim 7, wherein the interface is further configured to generate the data feed based on the crawlable definition for the business object associated with the application.

13. A computer readable storage medium storing a computer program product executable by computer system for crawling application data from an application data store storing business objects associated with an application, the computer-readable storage medium comprising:

program code for identifying a first request for application data received from a search engine as a seed universal resource locator (URL) sourcing a business object associated with the application for crawling by the search engine;

program code for accessing a crawlable definition for the business object associated with the application, the crawlable definition including information specifying a query selecting one or more attributes of the business object associated with the application;

program code for receiving query results in response to sending the query to the application data store;

program code for forming a crawlable document based on the query results, the crawlable document including instances of the business object from the query results;

program code for generating a data feed based on the crawlable document;

program code for generating a control feed based on dividing the data feed into a set of transferable batches;

program code for generating batch URLs for transferable batches in the set of transferable batches;

program code for returning a feed document to the search engine, the feed document comprising the control feed and the batch URLs for the transferable batches in the set of transferable batches;

program code for identifying a second request for application data received from the search engine as a re-entry URL;

program code for returning a batch from the data feed to the search engine where the batch is requested in the re-entry URL;

program code for returning a related document to the search engine where the related document is requested in the re-entry URL; and program code for returning a dependent document to the search engine where the dependent document is requested in the re-entry URL.

14. The computer-readable storage medium according to claim 13, wherein the feed document further comprises the data feed.

15. A computer-implemented method for crawling structured application data of an application by a search engine, the method comprising:

generating, with one or more processors associated with one or more computer systems hosting a search engine, a first request for application data as a seed link sourcing a business object associated with the application;

sending, from the one or more computer systems hosting the search engine, the first request for the sourced business object associated with the application;

receiving, at the one or more computer systems, a control feed generated in response to the seed link and a crawlable definition for the business object associated with the application, the crawlable definition including information specifying a query selecting one or more attributes of the business object associated with the application, the control feed comprising information dividing a data feed associated with a crawlable document into a set of transferable batches according to predetermined criteria and one or more re-entry links for each transferable batches in the set of transferable batches;

crawling, with the one or more processors associated with the one or more computer systems, the control feed to push the one or more re-entry links onto a job queue maintained by the one or more computer systems;

generating, with the one or more processors associated with the one or more computer systems, a second request for structured application data as a re-entry link associated with the feed document, the second request being for a re-entry link of the one or more re-entry links in the job queue;

sending, from the one or more computer system, the second request for structured application data;

receiving, at the one or more computer systems, a crawlable batch from the data feed where the batch is requested in the re-entry link as a batch link;

receiving, at the one or more computer systems, a crawlable related document where the crawlable related document is requested in the re-entry link as a related document link; and receiving, at the one or more computer systems, a crawlable dependent document where the crawlable related document is requested in the re-entry link as a dependent document link.

16. The method of claim 15, further comprising:

indexing, with the one or more computer systems, a content of the received crawlable batch according to an indexing rule set out in metadata of the received batch.

17. The method of claim 15, further comprising:

indexing, with the one or more computer systems, a content of the received crawlable document according to an indexing rule set out in metadata of the received document.

18. The method of claim 15, further comprising:

indexing, with the one or more computer systems, a content of the received crawlable dependent document according to an indexing rule set out in metadata of the received dependent document.

19. The method of claim 15, further comprising:

indexing, with the one or more computer systems, a content of the received crawlable batch according to an indexing rule set out in metadata of the received batch.

20. The method of claim 15, further comprising:

indexing, with the one or more computer systems, a content of the received crawlable document according to an indexing rule set out in metadata of the received document.

21. The method of claim 15, further comprising:

indexing, with the one or more computer systems, a content of the received crawlable dependent document according to an indexing rule set out in metadata of the received dependent document.

* * * * *